G. T. FORSYTH.
UNIVERSAL JOINT.
APPLICATION FILED MAR. 12, 1920.

1,406,361.

Patented Feb. 14, 1922.

Inventor
George T. Forsyth
By Louis Quarles
Attorney.

UNITED STATES PATENT OFFICE.

GEORGE T. FORSYTH, OF ST. PAUL, MINNESOTA.

UNIVERSAL JOINT.

1,406,361.  Specification of Letters Patent.  Patented Feb. 14, 1922.

Application filed March 12, 1920. Serial No. 365,150.

*To all whom it may concern:*

Be it known that I, GEORGE T. FORSYTH, a citizen of the United States, residing at St. Paul, county of Ramsey, and State of Minnesota, have invented a certain new and useful Universal Joint, of which the following is a specification.

This invention relates to a new and improved universal joint adapted particularly for use on automobiles, motor trucks, and the like.

Among the salient objects of my invention are to eliminate friction joints and sliding surfaces such as the pins in common use on universal joints today, which not only absorb a great deal of energy but are subject to wear and give rise to lost motion and consequent back lash. My invention is also designed to produce a universal joint which will operate without lubrication and need not be protected by special housings from splashing mud, snow, etc. It is further designed so that there are no machined surfaces that bear or move one on another and consequently is not subjected to abrasion and cutting by reason of lack of lubrication and the deleterious effects of sand, grit, etc. It is also much more simple of installation, adjustment, and repair, and can be repaired by any mechanic in a few minutes' time. My invention is further designed to give a universal joint which will give a constant uniform torque and application of power and rotation between the driving and driven shafts without the variations therein that are incident to the other types of universals commonly in use. Where the angular displacement between the two shafts is not too great I can also eliminate the slip joint which is necessary with the present type of universal joints. I am also enabled by the use of my invention to build a joint without pins and free from semielastic bodies such as rubber, leather and the like which are subject to rapid wear and deterioration, particularly by cupping, abrasion, etc., and which are ill adapted to the transmission of great strains and shocks which are necessarily met with in actual practice.

With reference to the drawings, which form a part of these specifications, I will now describe a specific embodiment of my invention.

Figure 1:
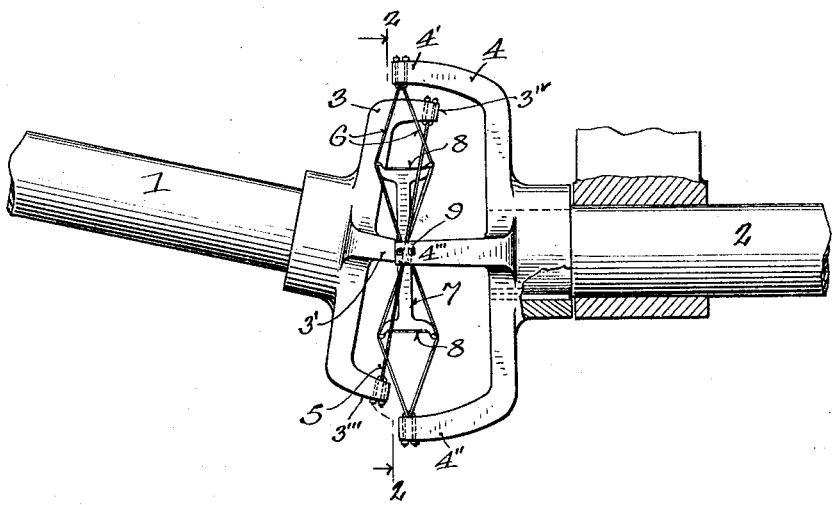
Figure 2:
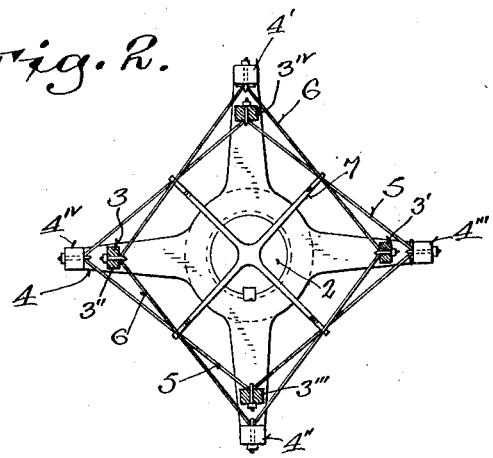
Figure 3:
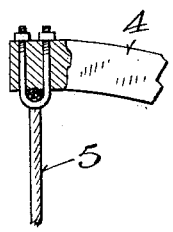

Fig. 1 is a side view of my improved universal joint; Fig. 2 is a sectional view along the lines 2—2 of Fig. 1 looking in the direction of the arrows; and Fig. 3 is a detailed view showing one means of attaching the cables to the ends of the prongs.

In the figures 1 represents the driving shaft, 2 the driven shaft, (although either may operate as the driving shaft) 3 the prongs on the driving shaft, 4 the prongs on the driven shaft, 5 the single cable for transmitting power from the driving prongs 3 to the driven prongs 4, 6 is the double cable for the same purpose, and 7 is the spider or spacing member attached to and spacing apart the double cable 6. In place of cable I may use other equivalent means for transmitting the longitudinal stresses, such as relatively thin sheets of spring steel.

In erecting the device the two shafts 1 and 2 are first substantially lined up and the double steel cable 6 is reeved as shown in Fig. 2, commencing at the upper driven prong 4', then affixed to the driving prong 3', then affixed to the lower driven prong 4'', then affixed to the driving prong 3'', and thence to and fastened at the place of beginning on the driven prong 4'. This cable is made double as shown in Fig. 1, the intermediate parts between the ends of the driving and driven prongs to which it is attached being spaced apart by the spider 7 as shown in Fig. 1. The whole is drawn taut and rigidly fastened to the prongs 4', 3', 4'', and 3''. The single cable 5 is then similarly reeved, commencing at the driven prong 4''', from whence it goes respectively to the driving prong 3''', to driven prong $4^{IV}$, to driving prong $3^{IV}$, and back to and is firmly anchored on driven prong 4'''. This cable is made single and is spaced so as to cross freely between the double cable 6 and play in the forked ends of the spider 7 as shown in Fig. 1.

The spider 7 is rigidly attached to the cable 6 and is made with sufficient play and depth of the ends 8 thereof so that the cable 5 may move freely and without contact therewith or with the cable 5 at the inclination between the shafts 1 and 2 is varied and as the device rotates when under power. I generally mount the prongs 3 and 4 on the shafts 1 and 2 respectively by means of keyways as shown in Fig. 1. The cables 5 and 6 are attached to the ends of the prongs 3 and 4 respectively by clamps or U-bolts as shown in Fig. 3 or other equivalent means.

It will be seen from this description that my improved universal joint provides for the turning in any direction about an imaginary center 9, the driving stresses and rotation being communicated from the shaft 1 to the shaft 2 by means of tension in the cables 5 and 6. The inclination between the shafts 1 and 2 causes negligible stresses only which are absorbed by a slight twisting or torsion and tension in the cables 5 and 6. The construction of my device, therefore, is such that these stresses are all reduced to a mimimum and the device may therefore be made much lighter than other types of universal joints and the unit stresses be kept well within the elastic limits of the materials used.

This universal is particularly adapted for use on automobiles and automobile trucks in that it is light, easily repaired, requires no attention or lubrication, and no protection from dust and dirt. In event of repairs the replacement of prongs, spider, or cable can be done by any mechanic. I have described one, and in accordance with my present knowledge, a preferred method of constructing my universal joint but the same may be varied at will within the scope of the appended claims.

Having thus fully described my invention, I claim:

1. A universal joint comprising a set of driving prongs and a set of a like number of driven prongs, the corresponding prongs of the two sets being adjacent and opposed, a flexible element connecting the remote driving prongs with the non-opposite, similarly remote driven prongs, a second flexible element connecting the remaining driving prongs with the non-opposite driven prongs, and means for preventing the flexible elements from coming into contact with each other.

2. A universal joint comprising a set of driving prongs and a set of a like number of driven prongs, the corresponding prongs of the two sets being adjacent and opposed, a flexible element connecting the remote driving prongs with the non-opposite, similarly remote driven prongs, a second flexible element connecting the remaining driving prongs with the non-opposite driven prongs, and detachable clamping means for attaching the flexible elements to said prongs.

3. A universal joint which consists of a driving shaft, four prongs spaced 90 degrees apart and removably attached thereto, a driven shaft, four prongs of a different spread than those of the driving shaft and spaced 90 degrees apart and removably attached to said driven shaft and lying in substantially the same planes as the driving prongs, a single cable rigidly attached to two diametrically opposed ends of the driving prongs and to the two ends of the driven prongs which have an angular displacement of 90 degrees from the aforesaid driving prongs, a double cable rigidly attached to two diametrically opposed ends of the driving prongs and to the two ends of the driven prongs which have an angular displacement of 90 degrees from the aforesaid driving prongs, a four-arm spider having concave spacing ends thereon rigidly attached to the double cable at points intermediate between the ends of the driven and driving prongs, and means for demountably attaching the cables to the ends of the said prongs and the said spider.

4. A universal joint comprising a set of driving prongs and a set of a like number of driven prongs, the corresponding prongs of the two sets being adjacent and opposed, a flexible element connecting the remote driving prongs with the non-opposite, similarly remote driven prongs, and a second flexible element connecting the remaining driving prongs with the non-opposite driven prongs.

5. A universal joint comprising a set of driving prongs and a set of driven prongs, the corresponding prongs of the two sets being adjacent and opposed, a double flexible cable connecting certain of the driving prongs with the non-opposite driven prongs, means for spacing the intermediate stretches of the double cable, and a second flexible cable connecting the remaining driving prongs and the non-opposite driven prongs, said second cable working between the spaced stretches of the double cable.

6. A universal joint comprising a set of driving prongs and a set of driven prongs, the corresponding prongs of the two sets being adjacent and opposed, a double flexible cable connecting certain of the driving prongs with the non-opposite driven prongs, a floating spider having a cable-engaging and spacing means on the end of each of its arms, each of said means holding the several intermediate stretches of the double cable spaced apart, and a second flexible cable connecting the remaining driving prongs and the non-opposite driven prongs, said second cable working between the spaced stretches of the double cable.

GEORGE T. FORSYTH.

Witnesses:
RAYMOND I. TENNANT,
F. H. DELANEY.